United States Patent
Sung et al.

(10) Patent No.: US 11,453,262 B2
(45) Date of Patent: Sep. 27, 2022

(54) VOID BUSH FOR VEHICLE SUSPENSION

(71) Applicants: HYUNDAI MOTOR COMPANY, Seoul (KR); KIA MOTORS CORPORATION, Seoul (KR)

(72) Inventors: Dae Un Sung, Incheon (KR); Kyung Jung Hwang, Anyang-si (KR); Yong Hyun Ryu, Seoul (KR); Hee Jung Lee, Seongnam-si (KR); Tae Hee Lee, Yongin-si (KR); Se Young Kim, Gimhae-si (KR); Jin Wook Park, Busan (KR); Seong Jun Heo, Gimhae-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 148 days.

(21) Appl. No.: 17/088,926

(22) Filed: Nov. 4, 2020

(65) Prior Publication Data
US 2021/0138859 A1 May 13, 2021

(30) Foreign Application Priority Data
Nov. 8, 2019 (KR) .................. 10-2019-0142210

(51) Int. Cl.
*B60G 7/04* (2006.01)
*F16F 9/30* (2006.01)

(52) U.S. Cl.
CPC .................. *B60G 7/04* (2013.01); *F16F 9/30* (2013.01); *B60G 2204/41* (2013.01); *B60G 2204/4502* (2013.01)

(58) Field of Classification Search
CPC .... F16F 1/38; F16F 1/3821; F16F 1/41; F16F 1/406; F16F 1/374; F16F 9/30;
(Continued)

(56) References Cited

U.S. PATENT DOCUMENTS 3,402,924 A * 9/1968 Rix .................. F16F 1/422
267/141
3,409,284 A * 11/1968 Rix .................. F16F 1/377
267/153

(Continued)

FOREIGN PATENT DOCUMENTS

CA 2732392 A1 * 8/2012 ......... B60G 21/0551
DE 102019132736 A1 * 6/2020 ............. B29B 11/14
(Continued)

OTHER PUBLICATIONS

European Search Report dated Apr. 16, 2021 from the corresponding European Application No. 20206144.6, 6 pp.

*Primary Examiner* — Paul N Dickson
*Assistant Examiner* — Maxwell L Meshaka
(74) *Attorney, Agent, or Firm* — Lempia Summerfield Katz LLC

(57) ABSTRACT

A void bush for a vehicle suspension includes: inside bumps formed in an inside stopper and outside bumps formed in an outside stopper. In particular, the inside bumps and the outside bumps are configured to cross perpendicularly to each other to allow the inside bumps and the outside bumps to be brought into point-contact with each other during behavior of the suspension. The inside bumps are not arranged in parallel to each other and the outside bumps are not arranged in parallel to each other. Accordingly, contact area between the inside bumps and the outside bumps is greatly reduced and contact abrasion positions therebetween are diversified so that durability and lifespan of the void bush are improved.

14 Claims, 11 Drawing Sheets

(58) Field of Classification Search
CPC .. F16F 2230/02; F16F 1/387; B60G 2204/41; B60G 2204/4104; B60G 2204/14; B60G 7/04; B60G 2204/4502; B60R 19/03
See application file for complete search history.

(56) References Cited

U.S. PATENT DOCUMENTS

| | | | | |
|---|---|---|---|---|
| 4,166,875 | A * | 9/1979 | Bussey, Jr. | B65D 81/09 428/179 |
| 4,169,179 | A * | 9/1979 | Bussey, Jr. | B65D 81/09 428/167 |
| 4,877,224 | A * | 10/1989 | Watts | F16F 7/12 267/140 |
| 8,967,337 | B2 * | 3/2015 | Senecal | B66D 1/54 267/140 |
| 2005/0202211 | A1 * | 9/2005 | Hachokowski | G02B 23/16 428/156 |
| 2007/0296128 | A1 | 12/2007 | Asano et al. | |
| 2010/0044939 | A1 * | 2/2010 | Hurwitz | F16F 1/376 267/153 |
| 2010/0327486 | A1 | 12/2010 | Kuki et al. | |
| 2020/0263751 | A1 * | 8/2020 | Ito | F16F 1/3615 |

FOREIGN PATENT DOCUMENTS

| | | | | |
|---|---|---|---|---|
| JP | H09-068247 | A | 3/1997 | |
| JP | 2007-247863 | A | 9/2007 | |
| KR | 10-2007-0032134 | A | 3/2007 | |
| KR | 20100035876 | A * | 4/2010 | ............... B60G 7/04 |
| KR | 20110023274 | A * | 3/2011 | ......... B60G 21/0551 |
| KR | 101791555 | B1 * | 10/2017 | ......... B60G 21/0551 |

* cited by examiner

VOID BUSH FOR VEHICLE SUSPENSION

CROSS REFERENCE TO RELATED APPLICATION

The present application claims priority to and the benefit of Korean Patent Application No. 10-2019-0142210, filed Nov. 8, 2019, the entire contents of which are incorporated herein by reference.

FIELD

The present disclosure relates generally to a void bush for a vehicle suspension.

BACKGROUND

The statements in this section merely provide background information related to the present disclosure and may not constitute prior art.

In general, a vehicle suspension is a device that connects an axle to a vehicle body and prevents vibration or shock from a road from being directly transmitted to the vehicle body during driving to prevent damage to the vehicle body or the cargo and to improve ride comfort.

The vehicle suspension includes a suspension arm for controlling motion of a wheel, and the suspension arm is coupled to a bush for improving ride comfort, steering stability, and shock absorption.

A conventional bush is a solid type bush in which a space between an inner pipe and an outer pipe is fully filled by a rubber bush. The solid type bush is good for steering stability, but has a disadvantage in ride comfort.

In order to secure steering stability and to improve ride comfort, a void bush in which a void is provided in the rubber bush filled between the inner pipe and the outer pipe was developed.

However, we have discovered that in the general void bush, the inside stopper and the outside stopper formed with the void positioned therebetween are brought into plane-contact with each other during the behavior of the suspension, and frictional vibration and noise are generated due to excessive contact area. Furthermore, durability of the bush is deteriorated.

The foregoing is intended merely to aid in the understanding of the background of the present disclosure, and is not intended to mean that the present disclosure falls within the purview of the related art that is already known to those skilled in the art.

SUMMARY

The present disclosure proposes a void bush for a vehicle suspension, wherein inside bumps and outside bumps respectively extend to cross perpendicularly to each other in an inside stopper and an outside stopper with a void positioned between the inside stopper and the outside stopper. The inside bumps and the outside bumps are brought into point-contact with each other during the behavior of the suspension, thus reducing vibration, noise, and abrasion of the void bush, and durability of the void bush may be improved.

In one aspect of the present disclosure, a void bush for a vehicle suspension includes: a rubber bush filled between an inner pipe and an outer pipe, wherein the rubber bush includes a void; and an inside stopper and an outside stopper arranged to face each other, the void positioned between the inside stopper and the outside stopper. In particular, the inside stopper includes an inside bump portion and the outside stopper may have an outside bump portion. The inside bump portion and the outside bump portion may be configured to cross each other; the inside bump portion may be provided with a plurality of bumps; the outside bump portion may be provided with a plurality of bumps; and among the plurality of inside bumps, a curvature of one inside bump located in a center of the plurality of inside bumps in a circumferential direction of the inner pipe may be greater than a curvature of one inside bump located in an outmost side of the plurality of inside bumps in the circumferential direction.

Each of the plurality of outside bumps may have a plurality of inflection points whose curvatures may be changed in the circumferential direction.

The plurality of inside bumps and the plurality of outside bumps may have different curvatures.

The plurality of inside bumps and the plurality of outside bumps may be arranged to cross each other at right angles.

The plurality of the inside bumps may not be arranged in parallel to each other by having respective curvatures configured to be gradually increased from the circumferentially outmost-side bump toward the circumferentially center-side bump.

Each of the outside bumps may have four inflection points; and the plurality of the outside bumps may not be arranged in parallel to each other by each having the four inflection points that may be arranged at different positions.

The inside bumps may be divided into a real contact section that actually may contact the outside bumps and a non-contact section that does not contact the outside bumps; the outside bumps may be divided into a real contact section that actually may contact the inside bumps and a non-contact section that does not contact the inside bumps; and real contact section-side inside bumps of the inside bumps and real contact section-side outside bumps of the outside bumps may have same height as each other.

The inside bumps may be divided into a real contact section that actually may contact the outside bumps and a non-contact section that does not contact the outside bumps; in the real contact section of the inside bumps, a curvature of a base portion foiled by connecting lowest points of real contact section-side inside bumps to each other may be less than or equal to a curvature of a highest portion formed by connecting highest points of the real contact section-side inside bumps to each other; in the non-contact section of the inside bumps, a curvature of a base portion formed by connecting lowest points of non-contact section-side inside bumps to each other may be equal to or greater than a curvature of a highest portion formed by connecting highest points of the non-contact section-side inside bumps to each other; and in the inside bumps, the base portion curvature of the real contact section and the base portion curvature of the non-contact section maybe connected to each other through inflection points through which the curvatures may be changed.

The outside bumps may be divided into a real contact section that actually may contact the inside bumps and a non-contact section that does not contact the inside bumps; in the real contact section of the outside bumps, a curvature of a base portion formed by connecting lowest points of real contact section-side outside bumps to each other may be less than or equal to a curvature of a highest portion formed by connecting highest points of the real contact section-side outside bumps to each other; in the non-contact section of the outside bumps, a curvature of a base portion formed by connecting lowest points of non-contact section-side outside bumps to each other may be equal to or greater than a curvature of a highest portion formed by connecting highest points of the non-contact section-side outside bumps to each other; and in the outside bumps, the base portion curvature of the real contact section and the base portion curvature of the non-contact section may be connected to each other through inflection points through which the curvatures may be changed.

The plurality of the inside bumps may be configured such that inside bumps continuously arranged and neighboring each other may have different sectional areas; and the plurality of the outside bumps may be configured such that outside bumps continuously arranged and neighboring each other may have different sectional areas.

Both a highest protrusion of each of the inside bumps and a highest protrusion of each of the outside bumps may have round shapes with predetermined curvatures.

Each of the inside bumps may extend in a left to right direction, which may be a penetration direction of the inner pipe, and the plurality of the inside bumps may be arranged in the circumferential direction.

Each of the outside bumps may extend in the circumferential direction and the plurality of the outside bumps may be arranged in a left to right direction, which may be a penetration direction of the inner pipe.

Each of the outside bumps may have a curvature greater than a curvature of each of the inside bumps.

As described above, in the void bush for a vehicle suspension according to the present disclosure, the inside bumps and the outside bumps are configured to be perpendicular to each other, and the inside bumps and the outside bumps are in point-contact with each other during the behavior of the suspension. In particular, through the curvature change of the inside bumps and the outside bumps and the inflection points of the outside bumps, the inside bumps are not formed in parallel to each other, and the outside bumps are not formed in parallel to each other. Whereby, the contact area between the inside bumps and the outside bumps can be greatly reduced, and the contact abrasion positions between the inside bumps and the outside bumps can be diversified. Accordingly, the void bush has an effect that local abrasion thereof can be prevented and thus durability and lifespan thereof can be improved.

In the real contact section of the inside bumps and the real contact section of the outside bumps of the present disclosure, the respective bumps have the same height H1 as each other. When the real contact sections are brought into contact with each other by the behavior of the suspension, uniform surface pressure may be induced, so that the void bush has an effect that local abrasion thereof can be prevented and thus durability and lifespan of the void bush can be improved.

The change of the base portion curvatures in the real contact section and the non-contact section of the inside bumps, the change of the base portion curvatures in the real contact section and the non-contact section of the outside bumps, and the inflection points are applied to the present disclosure, so that the volume of the rubber bush may be greatly reduced compared to the conventional bush. Through the above effect, the contraction space may be increased during low temperature contraction, and as a result, a gap of the void between the inside stopper and the outside stopper may be greatly reduced under the low temperature condition where joint is well generated. Accordingly, initial contact timing and contact area due to increase of the gap can be reduced under the same friction load condition, so that the void bush has an effect that durability and lifespan thereof can be improved.

The inside bumps and the outside bumps that are brought into contact with each other during the behavior of the suspension are configured such that bumps having different sectional areas are brought into contact with each other on the basis of a first reference line and a second reference line. Accordingly, the contact area between the inside bumps and the outside bumps may be greatly reduced, and the contact abrasion positions between the inside bumps and the outside bumps may be diversified, so that the void bush has an effect that local abrasion thereof can be prevented and thus durability and lifespan of the void bush can be improved.

Both the highest protrusion of each of the inside bumps and the highest protrusion of each of the outside bumps are formed in round shapes with predetermined curvatures without flat surfaces. Therefore, the contact area between the inside bumps and the outside bumps may be greatly reduced, so that the void bush has an effect that local abrasion thereof can be prevented and thus durability and lifespan of the void bush can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
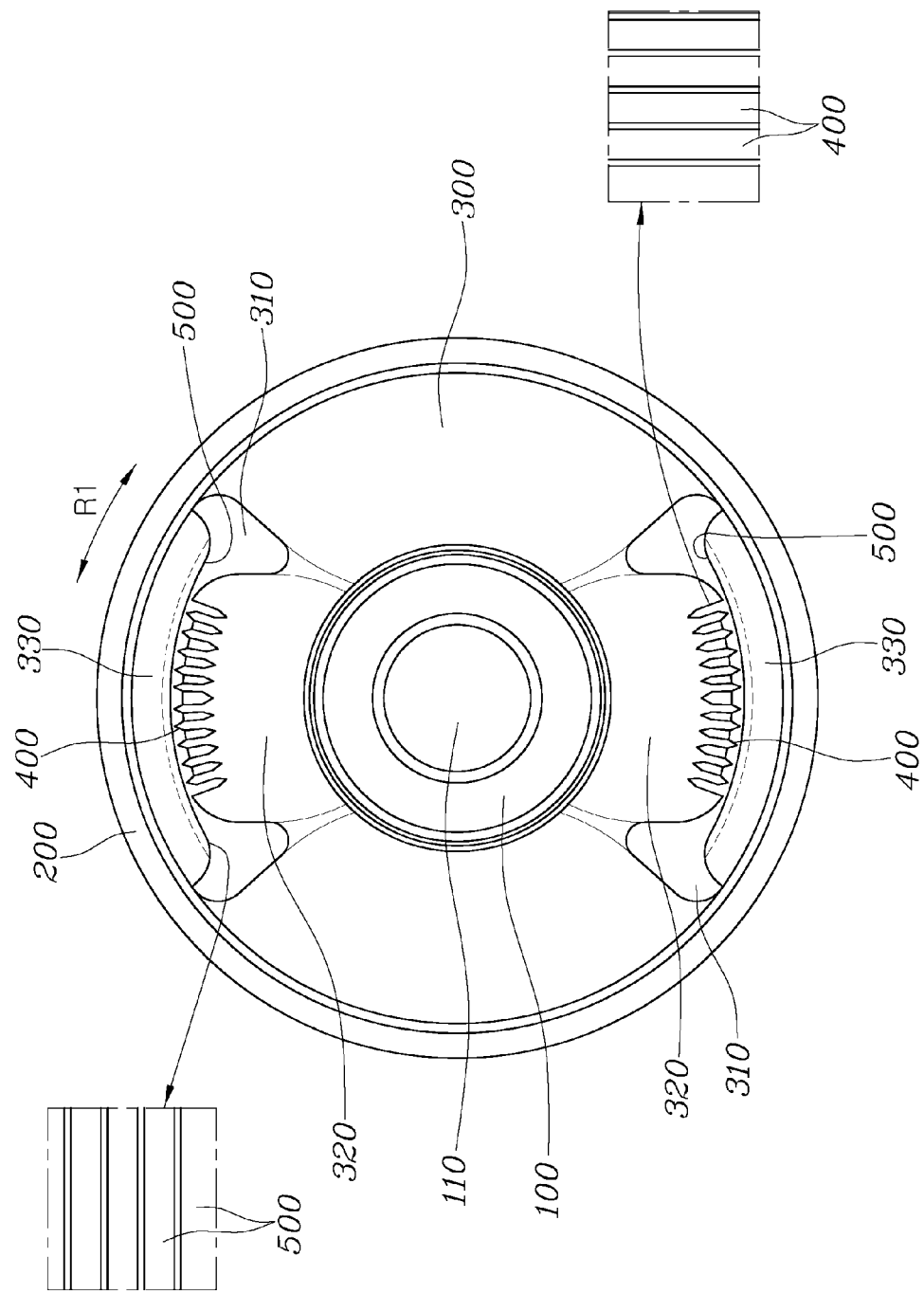
FIG. 1 is a front view showing a void bush for a vehicle suspension according to one form of the present disclosure.
Figure 2:
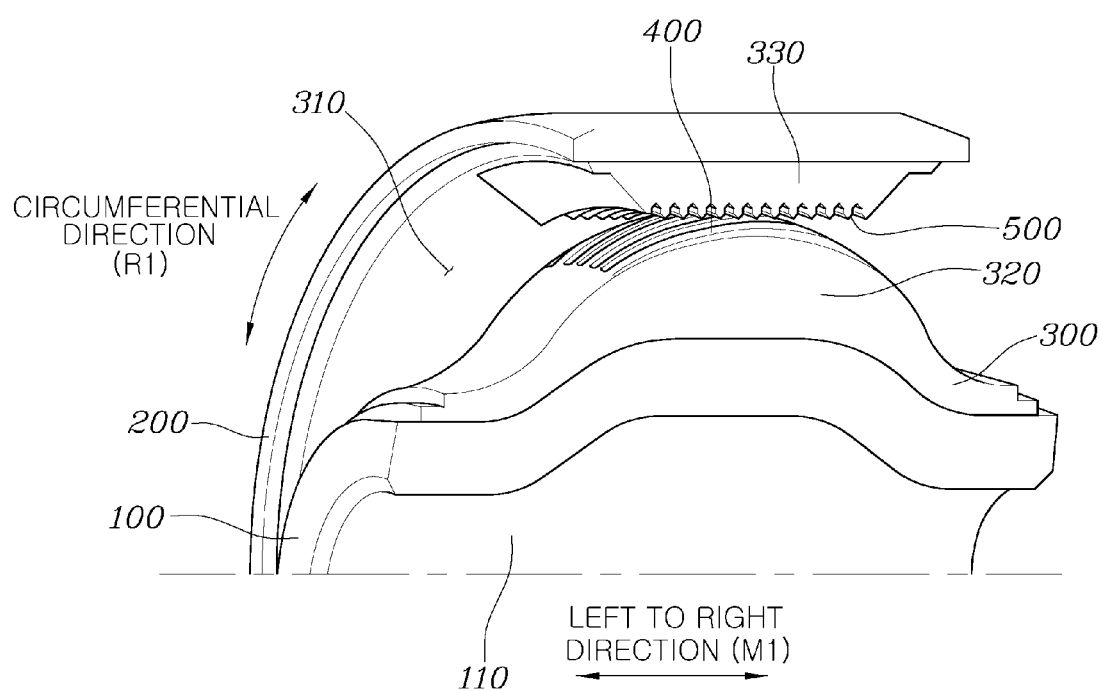
FIG. 2 is a partial perspective view showing the void bush for a vehicle suspension in FIG. 1.
Figure 3:
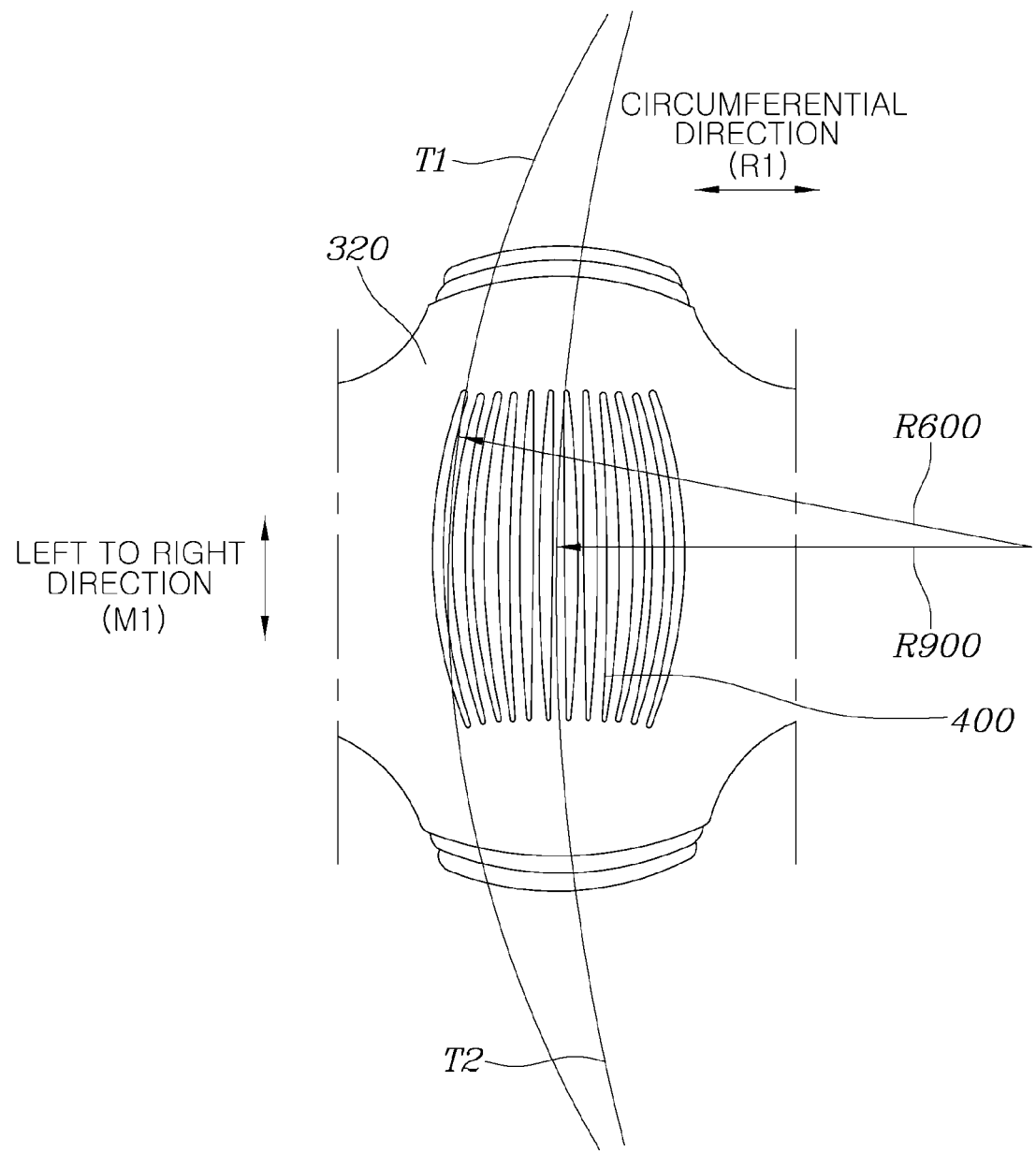
FIG. 3 is a top view showing inside bumps formed in an inside stopper.
Figure 4:
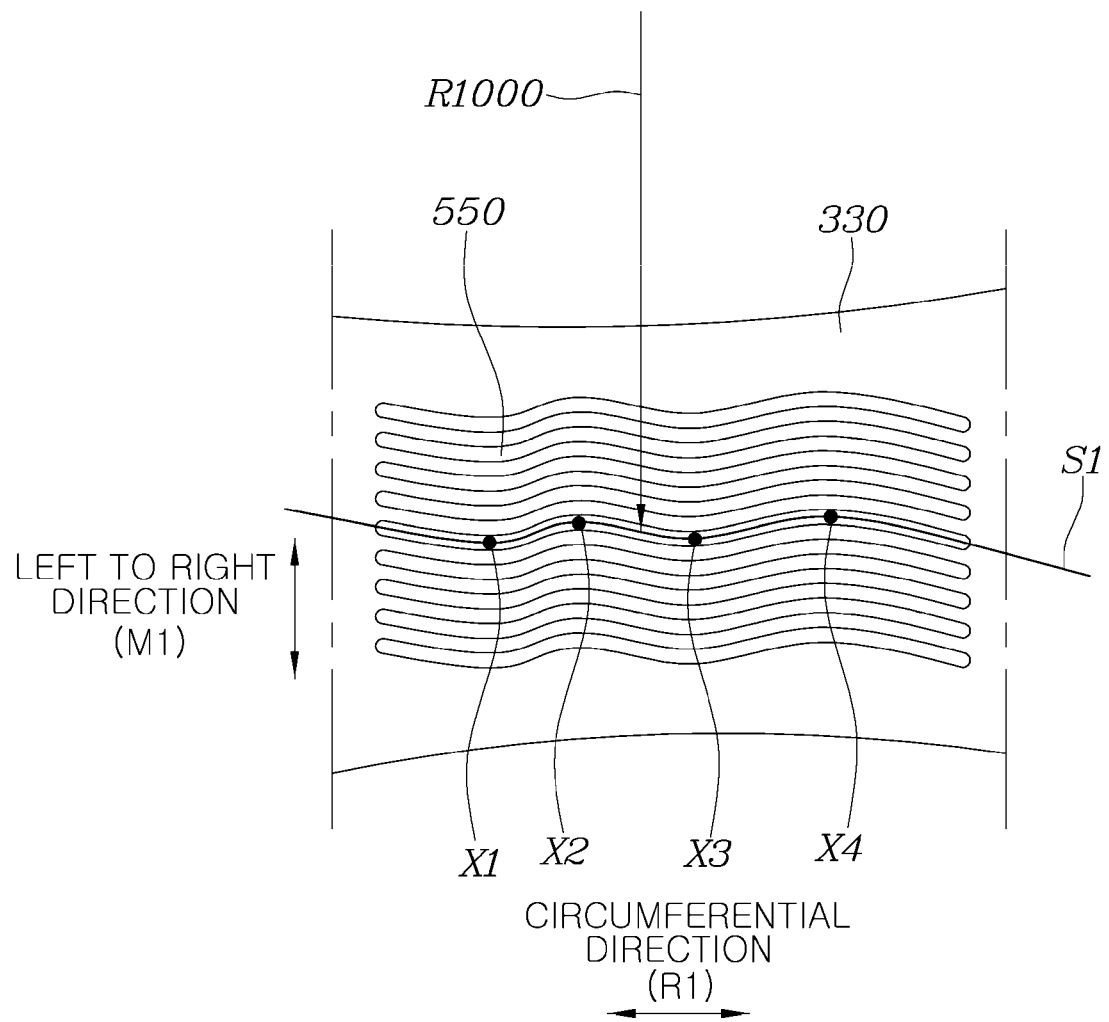
FIG. 4 is a top view showing outside bumps formed in an outside stopper.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, a void bush for a vehicle suspension according to an exemplary form of the present disclosure will be described with reference to the accompanying drawings.

In one form of the present disclosure, as shown in FIGS. 1 to 9, the void bush for a vehicle suspension includes: an inner pipe 100 having a hole 110 passing from a first end thereof to a second end thereof, an outer pipe 200 positioned outside the inner pipe 100, and a rubber bush 300 filled in a space between the inner pipe 100 and the outer pipe 200 and having a void 310.

The rubber bush 300 has an inside stopper 320 and an outside stopper 330, which are arranged to face each other so that the void 310 is positioned between the inside stopper 320 and the outside stopper 330. A front surface of the inside stopper 320 has a portion formed with inside bumps 400 and a front surface of the outside stopper 330 has a portion formed with outside bumps 500.

The inside bumps 400 and the outside bumps 500 are arranged to face each other and to cross each other at right angles.

In other words, the inside bumps 400 extend in a left to right direction (arrow M1), which is a penetration direction of the inner pipe 100, include a plurality of inside bumps 400 arranged in a circumferential direction (arrow R1). The inside bumps 400 have curvatures T1, T2, etc. as the inside bump goes from opposite ends thereof toward a center portion between the opposite ends (referring to FIG. 3).

In the inside bumps 400, a curvature T1 of one of the inside bumps 400 located in the outmost side of the inside bumps 400 in the circumferential direction is the smallest curvature (curvature of R600 or more). In addition, a curvature T2 of one of the inside bumps 400 located in the center of the inside bumps 400 in the circumferential direction is the greatest curvature (curvature of R900 or more). As curvatures of the inside bumps 400 are gradually increased from the outmost-side bump with the smallest curvature to the center-side bump with the greatest curvature, the plurality of the inside bumps 400 is not configured in parallel to each other.

The outside bumps 500 extend in the circumferential direction (arrow R1), and include a plurality of the outside bumps 500 arranged in the left to right direction (arrow M1). The outside bumps 500 have curvatures S1, etc., which are curved as an outside bump goes from opposite ends of the circumferential direction (arrow R1) to a center portion between the opposite ends (referring to FIG. 4).

Each of the outside bumps 500 has four inflection points X1, X2, X3, and X4 whose curvature is changed in the circumferential direction. The plurality of the outside bumps 500 is not arranged in parallel to each other by each having the four inflection points X1, X2, X3, and X4, which are arranged at different positions.

The curvatures T1, T2, etc. of the inside bumps 400 and the curvatures S1, etc. of the outside bumps 500 are formed differently from each other. In one form, the outside bumps 500 are formed with curvatures of R1000 or more to have curvatures greater than the curvatures of the inside bumps 400.

Accordingly, the inside bumps 400 and the outside bumps 500 are formed in a perpendicular direction to each other, so that the inside bumps 400 and the outside bumps 500 are in point-contact with each other during the behavior of a suspension. In particular, due to curvature variations of the inside bumps 400 and the outside bumps 500 and the inflection points X1, X2, X3, and X4 of each of the outside bumps 500, the inside bumps 400 are not formed in parallel to each other and the outside bumps 500 are not formed in parallel to each other. Accordingly, the contact area between the inside bumps 400 and the outside bumps 500 may be greatly reduced and the contact abrasion positions between the inside bumps 400 and the outside bumps 500 may be diversified, so that local abrasion of the void bush may be prevented, and through the abrasion prevention, durability and lifespan of the void bush may be improved.

Figure 5:
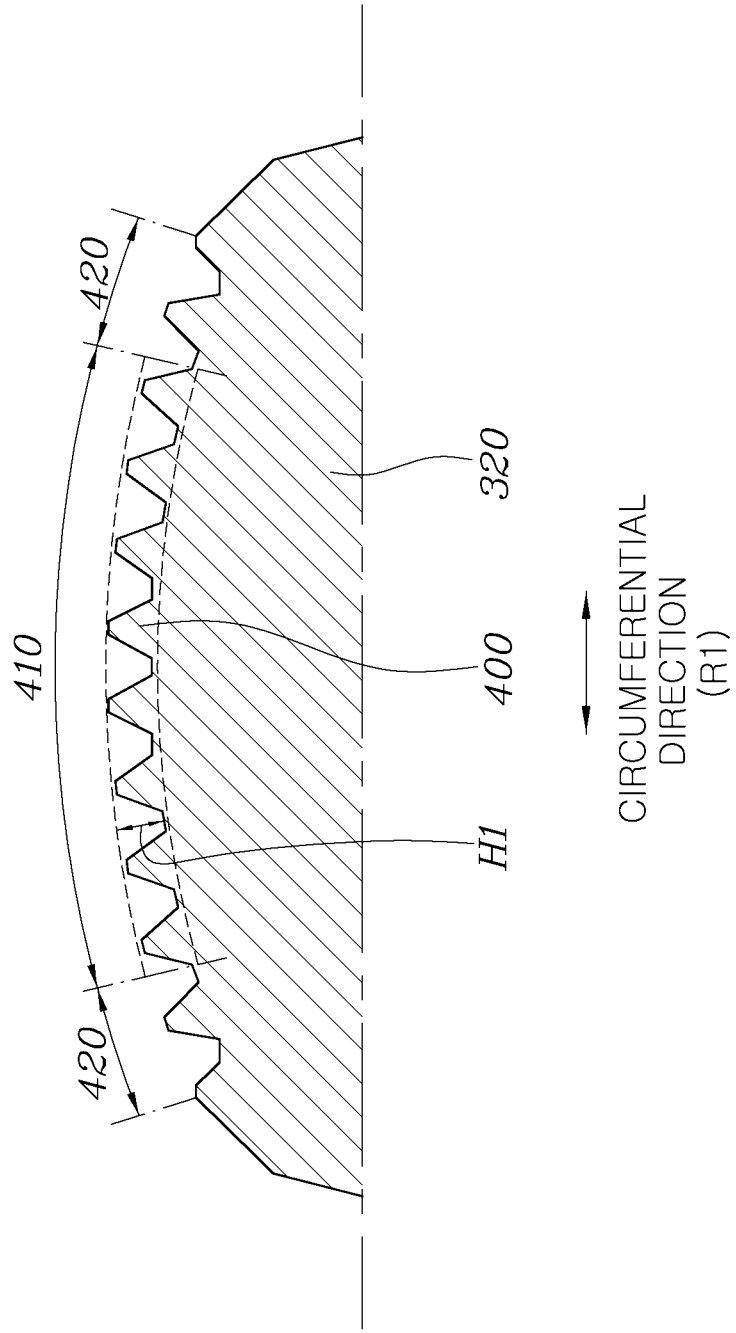
FIG. 5 is a sectional view showing the inside stopper with the inside bumps.
Figure 6:
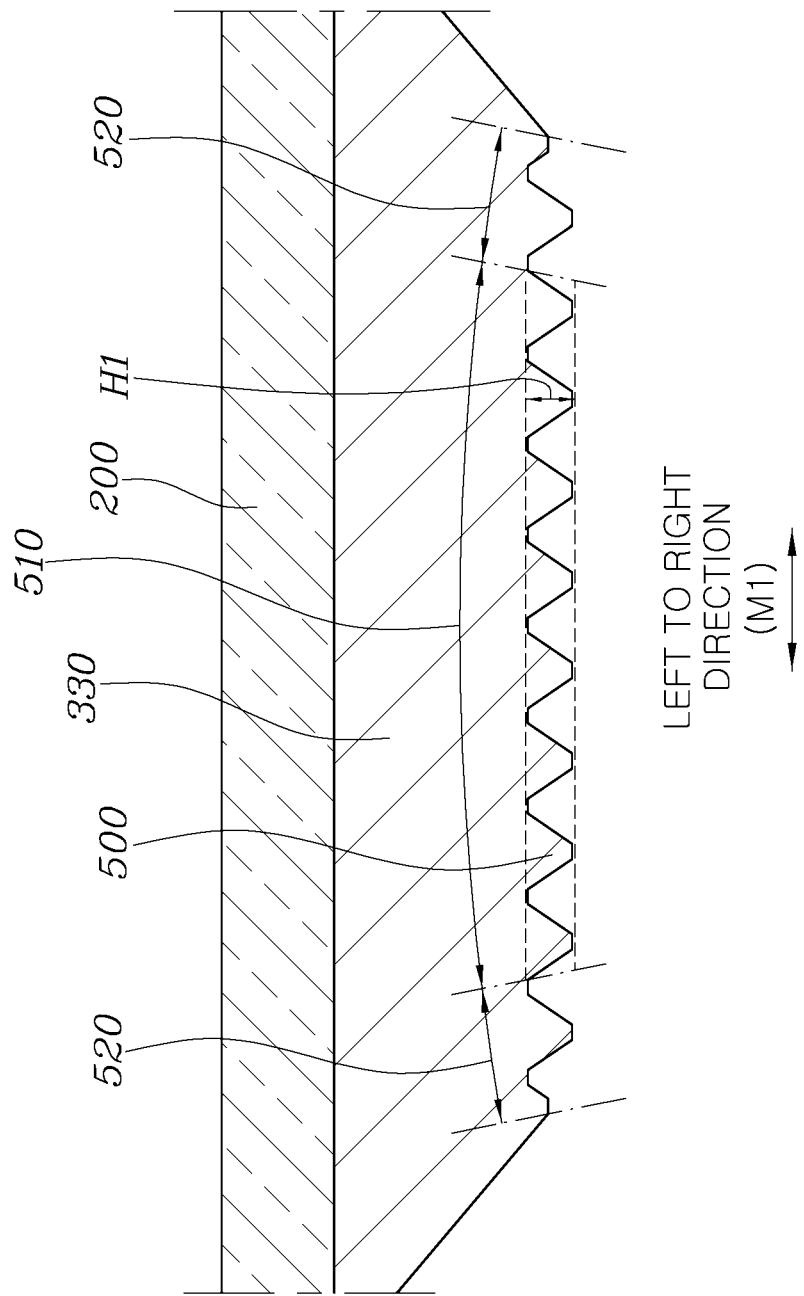
FIG. 6 is a sectional view showing the outside stopper with the outside bumps.

As shown in FIGS. 5 and 6, the inside bumps 400 are divided into a real contact section 410 that actually contacts the outside bumps 500 and a non-contact section 420 that does not contact the outside bumps 500. The outside bumps 500 are divided into a real contact section 510 that actually contacts the inside bumps 400 and a non-contact section 520 that does not contact the inside bumps 400. During the behavior of the suspension, the real contact section 410 of the inside bumps 400 and the real contact section 510 of the outside bumps 500 are brought into contact with each other.

A bump height H1 of the real contact section 410 of the inside bumps 400 and a bump height H1 of the real contact section 510 of the outside bumps 500 are formed to have the same size. In addition, a bump height of the non-contact section 420 of the inside bumps 400 and a bump height of the non-contact section 520 of the outside bumps 500 may be formed to have the same size or different sizes.

When the real contact section 410 of the inside bumps 400 and the real contact section 510 of the outside bumps 500 are formed to have the same size of the bump height H1, the real contact section 410 of the inside bumps 400 and the real contact section 510 of the outside bumps 500 are brought into contact with each other by the behavior of the suspension, thereby inducing uniform surface pressure. Accordingly, local abrasion of the void bush may be prevented so that durability and lifespan of the void bush may be improved.

Figure 7:
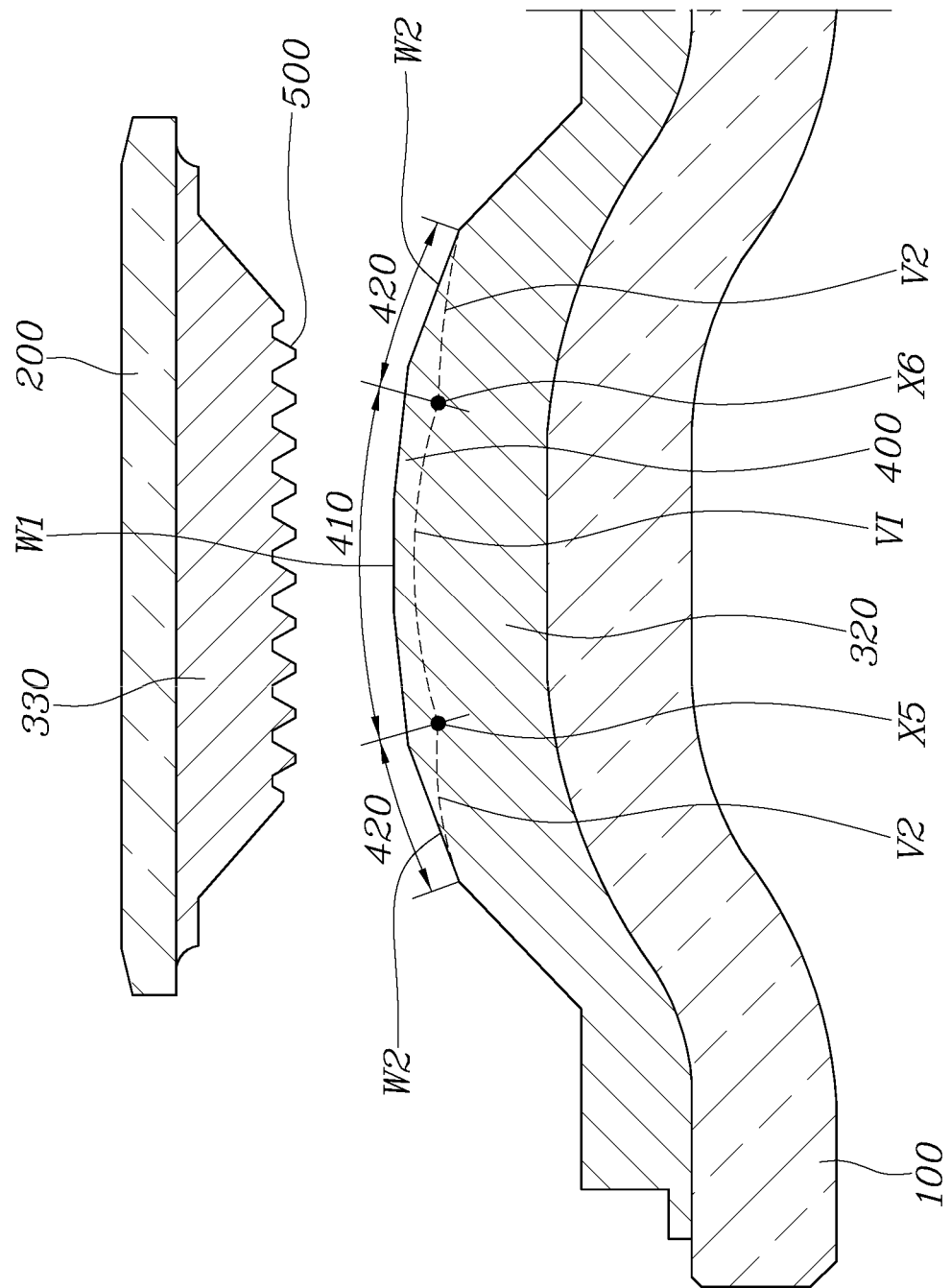
FIGS. 7 to 11 are views showing the inside bumps and the outside bumps according to some forms of the present disclosure.

As shown in FIG. 7, in the real contact section 410 of the inside bumps 400, a curvature V1 of a base portion famed by connecting lowest points of real contact section-side inside bumps to each other is less than or equal to a curvature W1 of a highest portion formed by connecting highest points of the real contact section-side inside bumps. In the non-contact section 420 of the inside bumps 400, a curvature V2 of a base portion formed by connecting lowest points of non-contact section-side inside bumps to each other is equal to or greater than a curvature W2 of a highest portion formed by connecting highest points of the non-contact section-side inside bumps to each other. In the inside bumps 400, the base portion curvature V1 of the real contact section 410 and the base portion curvature V2 of the non-contact section 420 are connected to each other through inflection points X5 and X6 through which the curvatures are changed.

Figure 8:
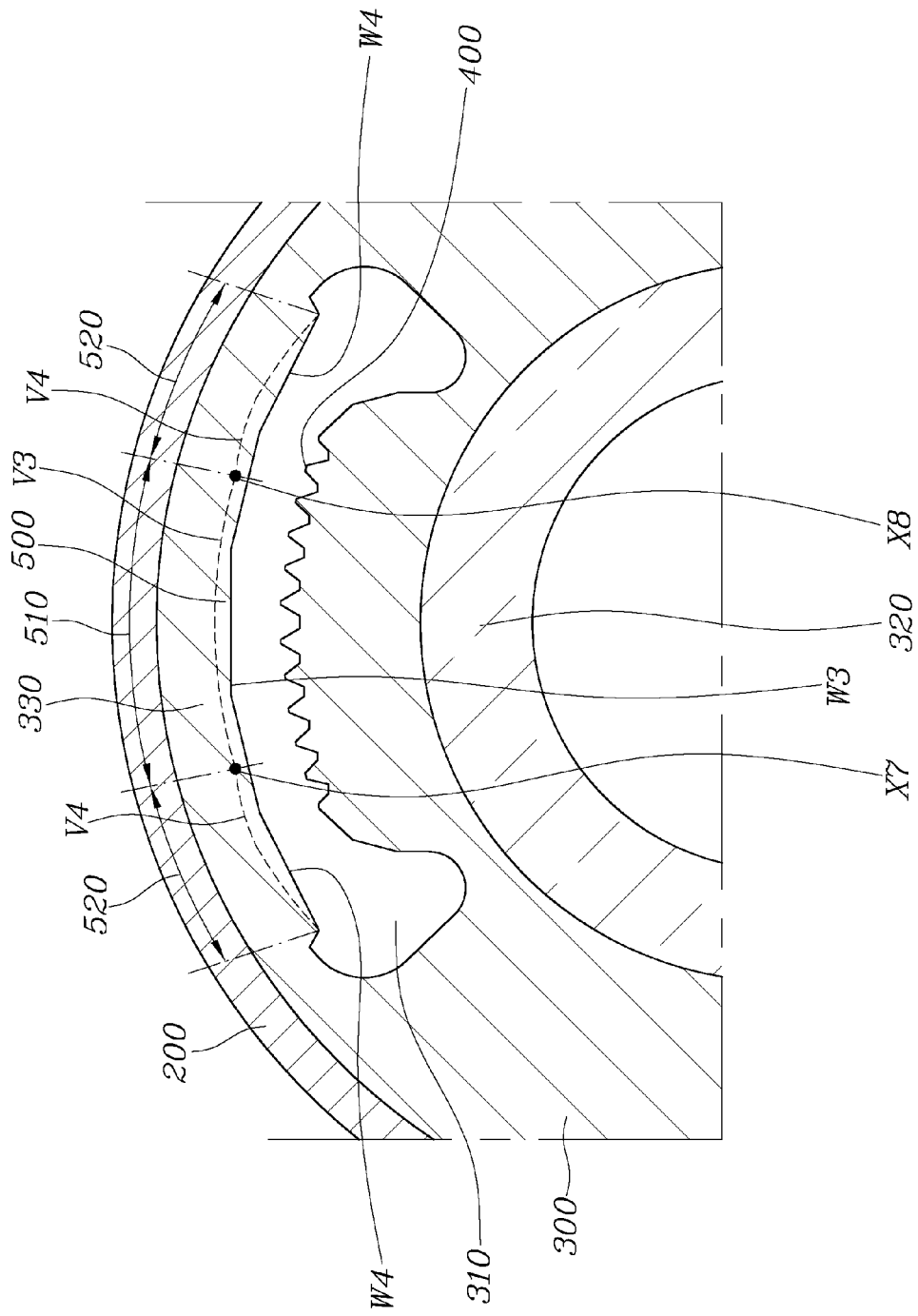

As shown in FIG. 8, in the real contact section 510 of the outside bumps 500, a curvature V3 of a base portion formed by connecting lowest points of real contact section-side outside bumps to each other is less than or equal to a curvature W3 of a highest portion formed by connecting highest points of the real contact section-side outside bumps to each other. In the non-contact section 520 of the outside bumps 500, a curvature V4 of base portion formed by connecting lowest points of non-contact section-side outside bumps to each other is equal to or greater than a curvature W4 of a highest portion formed by connecting heist points of the non-contact section-side outside bumps to each other. In the outside bumps 500, the base portion curvature V3 of the real contact section 510 and the base portion curvature V4 of the non-contact section 520 are connected to each other through inflection points X7 and X8 through which the curvatures are changed.

The change of the base portion curvatures V1 and V2 in the real contact section 410 and the non-contact section 420 of the inside bumps 400, the change of the base portion curvatures V3 and V4 in the real contact section 510 and the non-contact section 520 of the outside bumps 500, and the inflection points X5, X6, X7, and X8 are applied in the void bush, so that the volume of the rubber bush 300 may be greatly reduced compared to the conventional bush. Through the above effect, the contraction space may be increased during low temperature contraction, and as a result, a gap of the void 310 between the inside stopper 320 and the outside stopper 330 may be greatly reduced under the low temperature condition where joint is well generated. Accordingly, initial contact timing and contact area due to increase of the gap may be reduced under the same friction load condition, and thus durability and lifespan of the void bush may be improved.

Figure 9:
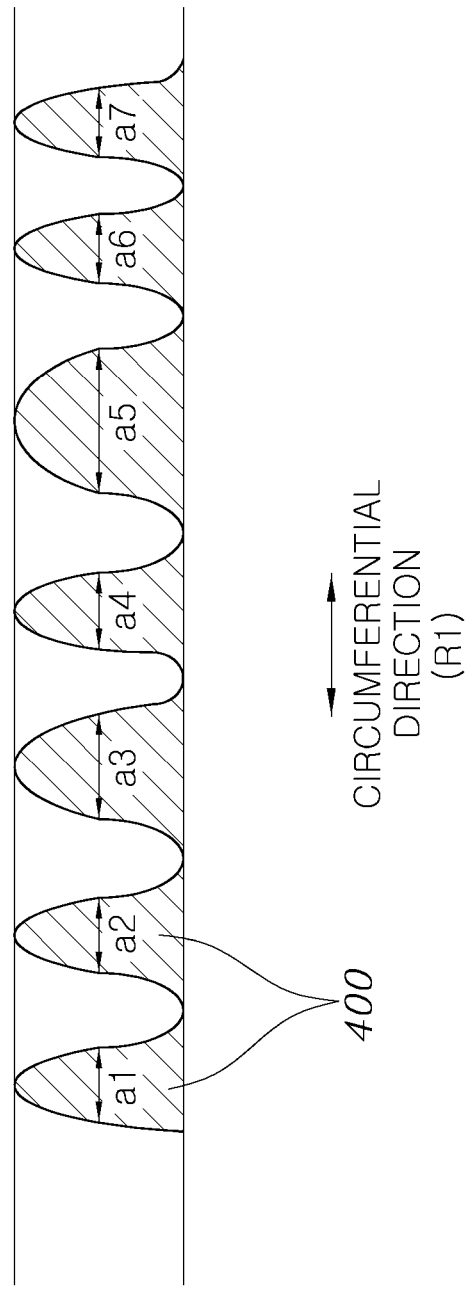
Figure 10:
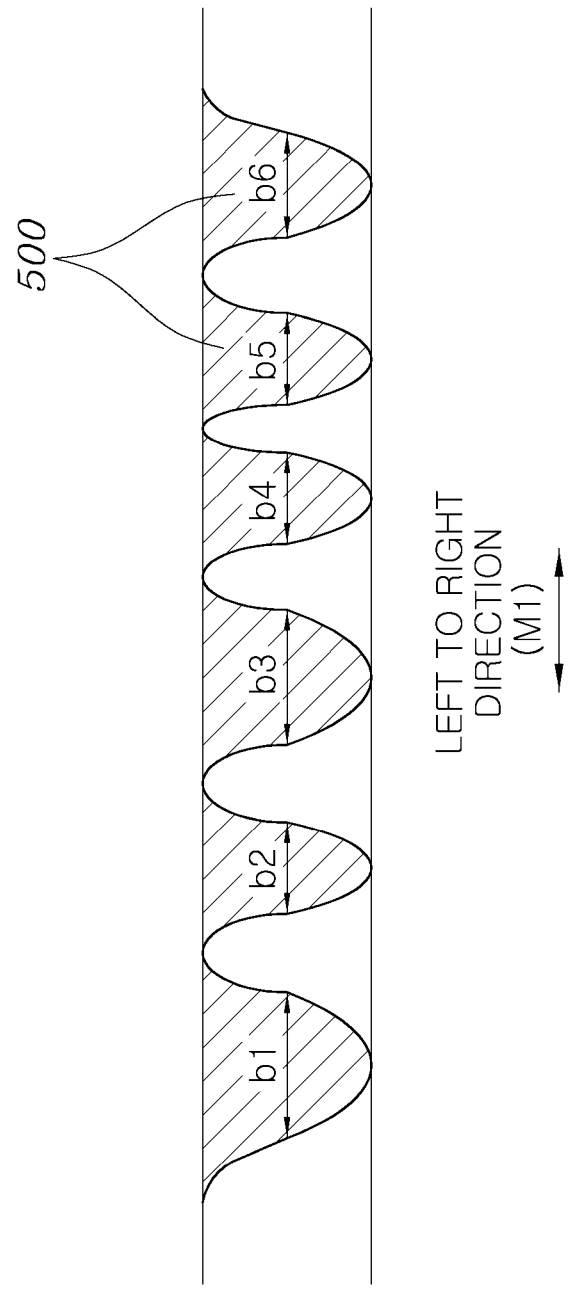

As shown in FIGS. 9 and 10, according to the form of the present disclosure, the plurality of the inside bumps 400 is configured such that inside bumps continuously arranged and neighboring each other are formed to have different sectional areas.

The inside bumps 400 are formed to have sectional areas a1, a2, a3, etc. that are continuously connected to each other, and one of the inside bumps 400 is formed to have a different sectional area from an inside bump adjacent thereto. In other words, a sectional area of a3 and adjacent sectional areas of a2 and a4 are formed differently from each other.

In the plurality of the outside bumps 500, outside bumps continuously arranged and neighboring each other are formed to have different sectional areas.

The outside bumps 500 are formed to have sectional areas b1, b2, b3, etc. that are continuously connected to each other, and one of the outside bumps 500 is formed to have a different sectional area from an outside bump adjacent thereto. In other words, a sectional area of b3 and adjacent section areas of b2 and b4 are formed differently from each other.

Accordingly, the inside bumps 400 and the outside bumps 500 that are brought into contact with each other during the behavior of the suspension have a configuration in which bumps having different sectional areas are in contact with each other. Whereby, the contact area between the inside bumps 400 and the outside bumps 500 may be greatly reduced, and the contact abrasion positions between the inside bumps 400 and the outside bumps 500 are diversified, so that local abrasion of the void bush may be prevented, and thus, durability and lifespan thereof may be improved.

Figure 11:
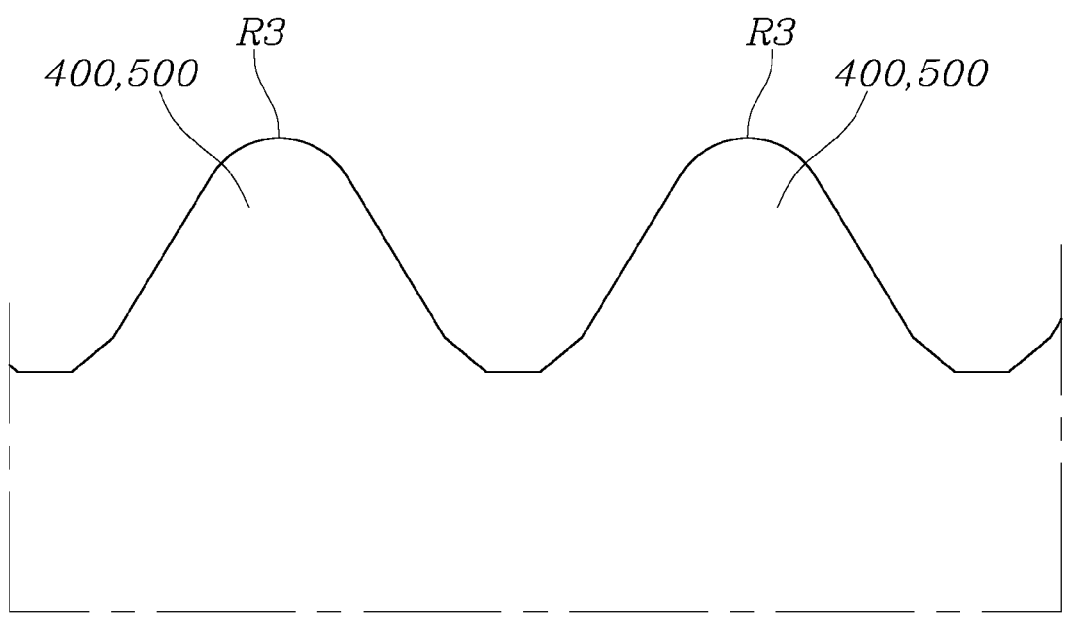

The inside bumps 400 and the outside bumps 500 may be formed to have sectional areas of various sizes As shown in FIG. 11, according to the present disclosure, both the highest protrusion of each of the inside bumps 400 and the highest protrusion of each of the outside bumps 500 are formed in round shapes R3 with predetermined curvatures without flat surfaces. Therefore, the contact area between the inside bumps 400 and the outside bumps 500 may be greatly reduced, so that local abrasion of the void bush may be prevented and thus durability and lifespan of the void bush may be improved.

As described above, in the void bush according to the form of the present disclosure, the inside bumps 400 and the outside bumps 500 are configured to be perpendicular to each other, the inside bumps 400 and the outside bumps 500 are in point-contact with each other during the behavior of the suspension. In particular, through the curvature change of the inside bumps 400 and the outside bumps 500 and the inflection points X1, X2, X3, and X4 of the outside bumps 500, the inside bumps 400 are not formed in parallel to each other, and the outside bumps 500 are not formed in parallel to each other. Whereby, the contact area between the inside bumps 400 and the outside bumps 500 may be greatly reduced, and the contact abrasion positions between the inside bumps 400 and the outside bumps 500 may be diversified. Accordingly, local abrasion of the void bush may be prevented and thus durability and lifespan of the void bush may be improved.

In the real contact section 410 of the inside bumps 400 and the real contact section 510 of the outside bumps 500 of the present disclosure, the respective bumps have the same height H1 as each other. When the real contact sections 410 and 510 are brought into contact with each other by the behavior of the suspension, uniform surface pressure may be induced, so that local abrasion of the void bush may be prevented and thus durability and lifespan of the void bush may be improved.

The change of the base portion curvatures V1 and V2 in the real contact section 410 and the non-contact section 420 of the inside bumps 400, the change of the base portion curvatures V3 and V4 in the real contact section 510 and the non-contact section 520 of the outside bumps 500, and the inflection points X5, X6, X7, and X8 are applied to the present disclosure, so that the volume of the rubber bush 300 may be greatly reduced compared to the conventional bush. Through the above effect, the contraction space may be increased during low temperature contraction, and as a result, a gap of the void 310 between the inside stopper 320 and the outside stopper 330 may be greatly reduced under the low temperature condition where joint is well generated. Accordingly, initial contact timing and contact area due to increase of the gap may be reduced under the same friction load condition, and thus durability and lifespan of the void bush may be improved.

The inside bumps 400 and the outside bumps 500 that are brought into contact with each other during the behavior of the suspension are configured such that bumps having different sectional areas are brought into contact with each other on the basis of a first reference line L1 and a second reference line L2. Accordingly, the contact area between the inside bumps 400 and the outside bumps 500 may be greatly reduced, and the contact abrasion positions between the inside bumps 400 and the outside bumps 500 may be diversified, so that local abrasion of the void bush may be prevented and thus durability and lifespan of the void bush may be improved.

Both the highest protrusion of each of the inside bumps 400 and the highest protrusion of each of the outside bumps 500 are formed in round shapes R3 with predetermined curvatures without flat surfaces. Therefore, the contact area between the inside bumps 400 and the outside bumps 500 may be greatly reduced, so that local abrasion of the void bush may be prevented and thus durability and lifespan of the void bush may be improved.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A void bush for a vehicle suspension, the void bush comprising:
 a rubber bush filled between an inner pipe and an outer pipe, the rubber bush including a void; and
 an inside stopper and an outside stopper arranged to face to each other, the void positioned between the inside stopper and the outside stopper,
 wherein:
 the inside stopper includes an inside bump portion and the outside stopper includes an outside bump portion,
 the inside bump portion and the outside bump portion are configured to cross each other, the inside bump portion is provided with a plurality of inside bumps, the outside bump portion is provided with a plurality of outside bumps, and among the plurality of inside bumps, a curvature of one inside bump located in a center of the plurality of inside bumps in a circumferential direction of the inner pipe is greater than a curvature of one inside bump located in an outmost side of the plurality of inside bumps in the circumferential direction.

2. The void bush of claim 1, wherein each outside bump of the plurality of outside bumps has a plurality of inflection points whose curvatures are changed in the circumferential direction.

3. The void bush of claim 1, wherein the plurality of inside bumps and the plurality of outside bumps have different curvatures.

4. The void bush of claim 1, wherein the plurality of inside bumps and the plurality of outside bumps are arranged to cross each other at right angles.

5. The void bush of claim 1, wherein inside bumps of the plurality of inside bumps are not arranged in parallel to each other by having respective curvatures configured to be gradually increased from a circumferentially outmost-side bump toward a circumferentially center-side bump, among the plurality of inside bumps.

6. The void bush of claim 2, wherein each outside bump of the plurality of outside bumps has four inflection points; and outside bumps of the plurality of the outside bumps are not arranged in parallel to each other by each having the four inflection points that are arranged at different positions.

7. The void bush of claim 1, wherein inside bumps of the plurality of inside bumps are divided into a real contact section that actually contacts outside bumps of the plurality of outside bumps and a non-contact section that does not contact the outside bumps;

the outside bumps are divided into a real contact section that actually contacts the inside bumps and a non-contact section that does not contact the inside bumps; and real contact section-side inside bumps among the inside bumps and real contact section-side outside bumps among the outside bumps have the same height as each other.

8. The void bush of claim 1, wherein inside bumps of the plurality of inside bumps are divided into a real contact section that actually contacts outside bumps of the plurality of outside bumps and a non-contact section that does not contact the outside bumps;

in the real contact section of the inside bumps, a curvature of a base portion formed by connecting lowest points of real contact section-side inside bumps to each other is less than or equal to a curvature of a highest portion formed by connecting highest points of the real contact section-side inside bumps to each other;

in the non-contact section of the inside bumps, a curvature of a base portion formed by connecting lowest points of non-contact section-side inside bumps to each other is equal to or greater than a curvature of a highest portion formed by connecting highest points of the non-contact section-side inside bumps to each other; and in the inside bumps, the base portion curvature of the real contact section and the base portion curvature of the non-contact section are connected to each other through inflection points through which the curvatures are changed.

9. The void bush of claim 1, wherein outside bumps of the plurality of outside bumps are divided into a real contact section that actually contacts inside bumps of the plurality of inside bumps and a non-contact section that does not contact the inside bumps;

in the real contact section of the outside bumps, a curvature of a base portion formed by connecting lowest points of real contact section-side outside bumps to each other is less than or equal to a curvature of a highest portion formed by connecting highest points of the real contact section-side outside bumps to each other;

in the non-contact section of the outside bumps, a curvature of a base portion formed by connecting lowest points of non-contact section-side outside bumps to each other is equal to or greater than a curvature of a highest portion formed by connecting highest points of the non-contact section-side outside bumps to each other; and in the outside bumps, the base portion curvature of the real contact section and the base portion curvature of the non-contact section are connected to each other through inflection points through which the curvatures are changed.

10. The void bush of claim 1, wherein inside bumps of the plurality of inside bumps are configured such that the inside bumps continuously arranged and neighboring each other have different sectional areas; and outside bumps of the plurality of outside bumps are configured such that the outside bumps continuously arranged and neighboring each other have different sectional areas.

11. The void bush of claim 1, wherein a highest protrusion of each inside bump of the plurality of inside bumps and a highest protrusion of each outside bump of the plurality of outside bumps respectively have round shapes with predetermined curvatures.

12. The void bush of claim 1, wherein each inside bump of the plurality of inside bumps extends in a left to right direction, which is a penetration direction of the inner pipe, and the plurality of inside bumps is arranged in the circumferential direction.

13. The void bush of claim 1, wherein each outside bump of the plurality of outside bumps extends in the circumferential direction and the plurality of outside bumps is arranged in a left to right direction, which is a penetration direction of the inner pipe.

14. The void bush of claim 1, wherein each outside bump of the plurality of outside bumps has a curvature greater than a curvature of each inside bump of the plurality of inside bumps.

* * * * *